(12) United States Patent
Tomsen

(10) Patent No.: US 7,103,908 B2
(45) Date of Patent: Sep. 5, 2006

(54) METHOD AND SYSTEM TO SAVE CONTEXT FOR DEFERRED TRANSACTION VIA INTERACTIVE TELEVISION

(75) Inventor: Mai-Ian Tomsen, Seattle, WA (US)

(73) Assignee: Diego, Inc., Kirkland, WA (US)

( * ) Notice: Subject to any disclaimer, the term of this patent is extended or adjusted under 35 U.S.C. 154(b) by 780 days.

(21) Appl. No.: 09/834,044

(22) Filed: Apr. 11, 2001

(65) Prior Publication Data

US 2002/0016965 A1 Feb. 7, 2002

Related U.S. Application Data

(63) Continuation of application No. 09/728,672, filed on Dec. 1, 2000.
(60) Provisional application No. 60/220,798, filed on Jul. 25, 2000, and provisional application No. 60/236,422, filed on Sep. 28, 2000.

(51) Int. Cl.
H04N 7/116 (2006.01)
H04N 5/445 (2006.01)

(52) U.S. Cl. .................. 725/141; 725/60; 725/142
(58) Field of Classification Search .............. 725/32, 725/37, 42, 51, 60, 104, 141, 142; 348/563, 348/564, 589; 705/26
See application file for complete search history.

(56) References Cited

U.S. PATENT DOCUMENTS

| | | | |
|---|---|---|---|
| 5,596,373 A | 1/1997 | White et al. | |
| 5,621,456 A | 4/1997 | Florin et al. | |
| 5,734,719 A | 3/1998 | Tsevdos et al. | |
| 5,805,154 A | 9/1998 | Brown | |
| 5,819,034 A | 10/1998 | Joseph et al. | 395/200.31 |
| 5,960,411 A | 9/1999 | Hartman et al. | 705/26 |
| 6,032,130 A | 2/2000 | Alloul et al. | |
| 6,058,373 A | 5/2000 | Blinn et al. | |
| 6,072,870 A | 6/2000 | Nguyen et al. | |
| 6,711,552 B1 * | 3/2004 | Kay et al. | 705/26 |
| 2002/0124255 A1 * | 9/2002 | Reichardt et al. | 725/42 |

* cited by examiner

Primary Examiner—Kieu-Oanh Bui
(74) Attorney, Agent, or Firm—Kory D. Christensen; Stoel Rives, LLP

(57) ABSTRACT

A viewer can save content and context related to a transaction conducted via an interactive television system. The transaction can involve obtaining information or ordering goods/services available from the Internet via the interactive television system. As an example, while the viewer is watching a television commercial on a first screen, the viewer can defer a transaction, capable of being conducted on a second screen, related to a product advertised in the television commercial or defer the viewing of the television commercial itself. Information related to the television commercial may be saved in a shopping cart for subsequent processing. Later, when the viewer wishes to continue the transaction or view the television commercial, the viewer may retrieve the shopping cart information, replay the television commercial, and then complete of the previously deferred transaction.

20 Claims, 10 Drawing Sheets

METHOD AND SYSTEM TO SAVE CONTEXT FOR DEFERRED TRANSACTION VIA INTERACTIVE TELEVISION

CROSS-REFERENCE TO RELATED APPLICATIONS

The present application is a continuation of U.S. patent application Ser. No. 09/728,672, filed Dec. 1, 2000, entitled "METHOD AND SYSTEM TO SAVE CONTEXT FOR DEFERRED TRANSACTION VIA INTERACTIVE TELEVISION," which claims the benefit of U.S. Provisional Patent Application Ser. No. 60/220,798, filed Jul. 25, 2000, entitled "METHODS AND SYSTEMS FOR COMMERCE VIA INTERACTIVE TELEVISION" and U.S. Provisional Patent Application Ser. No. 60/236,422, filed Sep. 28, 2000, entitled "METHODS AND SYSTEMS FOR COMMERCE VIA INTERACTIVE TELEVISION," all of which are incorporated herein by reference.

TECHNICAL FIELD

This disclosure relates generally to commerce over a data communication network, and more particularly but not exclusively, to transactions involving goods and/or services conducted via an interactive television network having connectivity to the data communication network.

BACKGROUND

An important business element in the production and distribution of television programming is revenue received from manufacturers and service providers who pay to advertise their products. The ubiquitous television commercial is the manifestation of this enterprise. The survival of a television program is heavily dependent on the advertising revenue that can be realized from the television program. Advertisers in turn rely on the ability of the television program to draw viewers who then become potential purchasers of the advertised products. An effective television commercial is one that captures the viewer's attention in a lasting manner and that ultimately results in the purchase of goods and/or services.

Television and Internet technologies are beginning to converge. In particular, access to the World Wide Web via an Internet-enabled television system (sometimes referred to as "interactive television" or "enhanced television") is progressing and becoming more popular. Viewers can obtain information about goods and services that are advertised in television commercials by, for example, connecting to the Internet while viewing interactive television and ordering the advertised products.

Television commercials do not always effectively reach the viewer for various reasons. For example, many viewers take the opportunity during the commercial break to do things other than watch the television commercial, and as a result, the viewers may miss a television commercial that may be of interest to them. Sometimes, the broadcast time of a television commercial is insufficient to provide interested viewers with time to write down a telephone number or an address needed for purchasing the advertised product. Furthermore, even if some television commercials advertise a product that is of potential interest to viewers, the viewers' attention span, recollection of the product, and interest in the product may be reduced because of distraction from subsequent commercials, from the regular programming, or from other events that adversely affect the original sentiment that spurred the viewers' interest. In short, there is often a decrease in the probability that a viewer will initiate and complete a transaction originated by a commercial.

Accordingly, improvements are needed in the advertisement of products in commercials and in the conducting of transactions related to the advertised products.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method and system for conducting transactions via interactive television and saving information related to the transactions are described herein. In the following description, numerous specific details are provided, such as the description of system components in FIGS. 1–3, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention allows a viewer or user to save information related to a television commercial being displayed via interactive television. For example, while the viewer is watching a television commercial, the viewer can begin a transaction to order an advertised product. If the viewer wishes to conduct the remainder of the transaction at a later time, such as during the next commercial break, then the viewer can save information related to that television commercial. In one embodiment, the information may be saved in a shopping cart. Later, when the viewer is ready to resume the transaction, the viewer can access the shopping cart and retrieve the saved information and/or other information to complete the purchase experience. In an embodiment, these subsequent viewer-initiated actions can include streaming at least a portion of the original television commercial, thereby potentially allowing the viewer to remember the original sentiment that brought about the initial interest in the advertised product.

Figure 1:
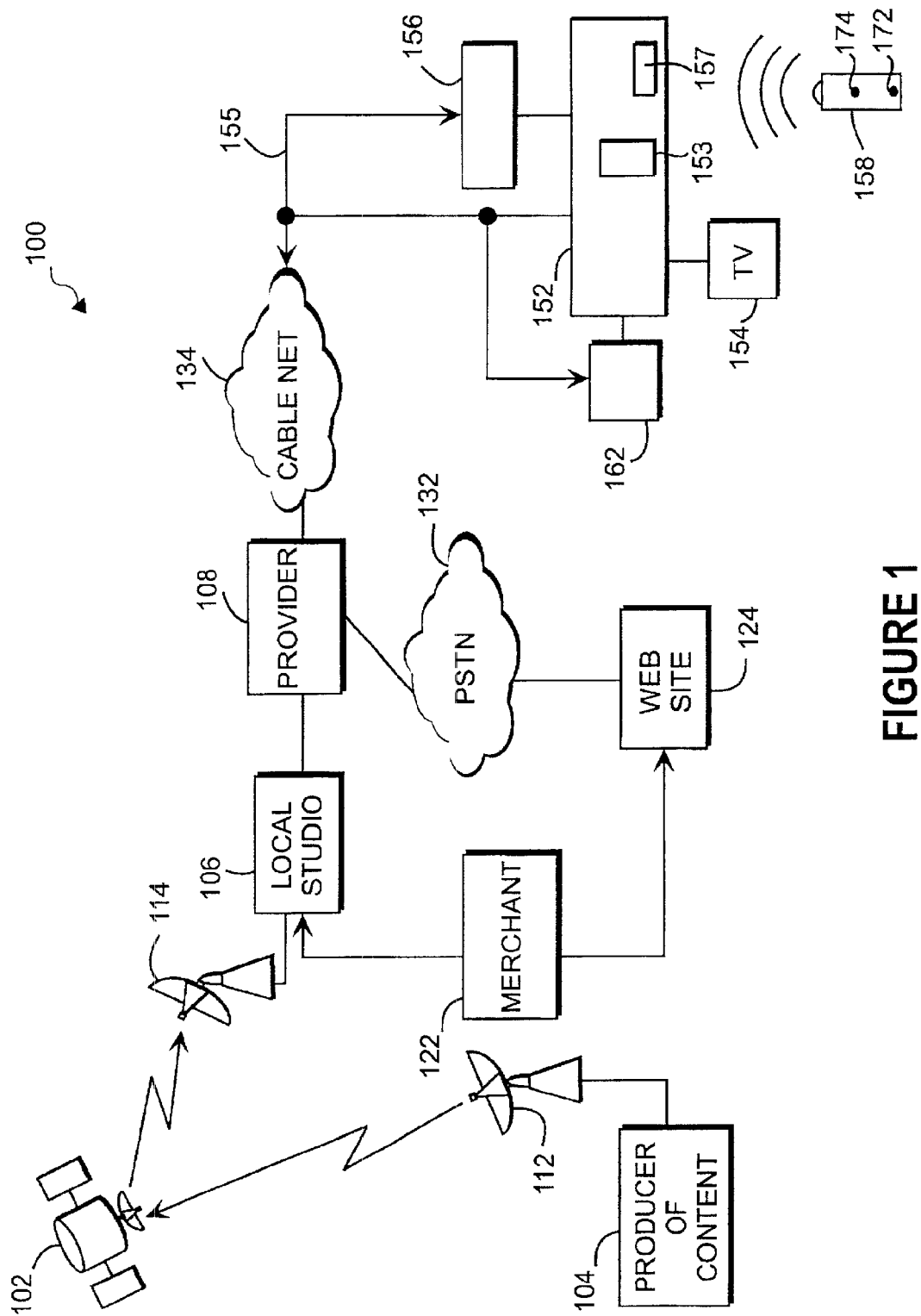
FIG. 1 shows an example of an interactive television system that can implement an embodiment of the invention.

FIG. 1 shows an example arrangement of an interactive television system 100 that can implement an embodiment of the invention. A production company 104 produces programming content for transmission to viewers. The transmission is sent over an uplink channel to a satellite 102. The satellite 102 then transmits the programming content over a downlink channel to a local studio 106. The local studio 106 can insert additional programming (e.g., regional programming) and/or advertisements as needed into the programming content. The content with the insertions is then transmitted from the local studio 106 to a cable service provider 108. In an embodiment, the television program may be downloaded to a receiving station, such as a head-end (H/E) of the cable service provider 108, rather than or in addition to the local studio 106. A reverse channel from the cable service provider 108 to the local studio 106 is provided so that the local studio 106 can insert additional programming content and feed the television signal back to the cable service provider 108. The cable service provider 108 then delivers the television signal over a cable network 134 to cable subscribers.

The cable network 134 is provided by the cable service provider 108 to distribute the programming content to cable subscribers. A set top box (STB) 152, located on the premises of a cable television subscriber, receives the programming content or television signal, and delivers the television signal to the subscriber's television set 154. Alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, etc. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware, as embodiments of the invention will work equally well using alternative reception and display arrangements.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched telephone network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission can occur via cable or satellite, and upstream data transmission can occur via a telephone line.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select a television program to view and then delivers the television program to the television set 154. A storage unit 162 can also be coupled to or be a part of the set top box 152. The storage unit 162 can comprise a machine-readable storage medium such as a cache, buffer, memory, diskette, compact disk, tape, or the like and their associated hardware, in one embodiment. In another embodiment the storage unit 162 can include a video cassette recorder (VCR). In another embodiment, the storage unit can include a hard disk such as a digital or personal video recorder (DVR or PVR).

As noted above, the local studio 106 can insert additional programming into the received transmission, for example, to provide cable content that includes locally provided channels. The programming is then distributed to customers over the cable network 134. In addition to local program insertion, the local studio 106 can insert advertising content. Product supplemental information relating to the advertising for participating merchants 122 can also be inserted. Product supplemental information can include information relating to the goods or services being advertised in the commercial. In addition to goods and services, coupons and other information services can be made available to the viewer, which in one embodiment can be obtained via the merchant's 122 web site 124 on the Internet. Triggers, such as Advanced Television Enhancement Forum (ATVEF) triggers, which are related to the web site 124 and/or to its contents, can be continuously updated as the television broadcast is being received.

In accordance with an embodiment of the invention, a participating merchant list 153 may be maintained. As the name implies, this list permits participating merchants 122 to provide their product supplemental information to the viewer. The participating merchant list 153 may be provided to and stored in the set top box 152. Alternately or additionally, the participating merchant list 153 may be stored at a head-end or other system of the cable service provider 108, or at a third party system. In this embodiment, the participating merchant list 153 may operate as a "white" list which allows transmission of triggers from authorized merchants and filters out other triggers. In another embodiment, a "blocked" or "black" list may be maintained at the set top box 152 or elsewhere. Such a blocked list filters out undesirable triggers and may be created and/or maintained by the cable service provider 108. Alternately or additionally, such a blocked list may be edited by an end user.

Various techniques for carrying the product supplemental information can be used. For example, triggering, announcement, or resource information can be included and sent using the ATVEF standard, in a manner known by those skilled in the art. For instance, a uniform resource locator (URL) address can be embedded in the broadcast stream. Other standards that may be used include triggering mechanisms from Wink and WorldGate. Another technique is to embed code or a script in the stream that runs on the client (e.g., at the set top box 152) to provide the information and/or purchase experience.

Figure 2:
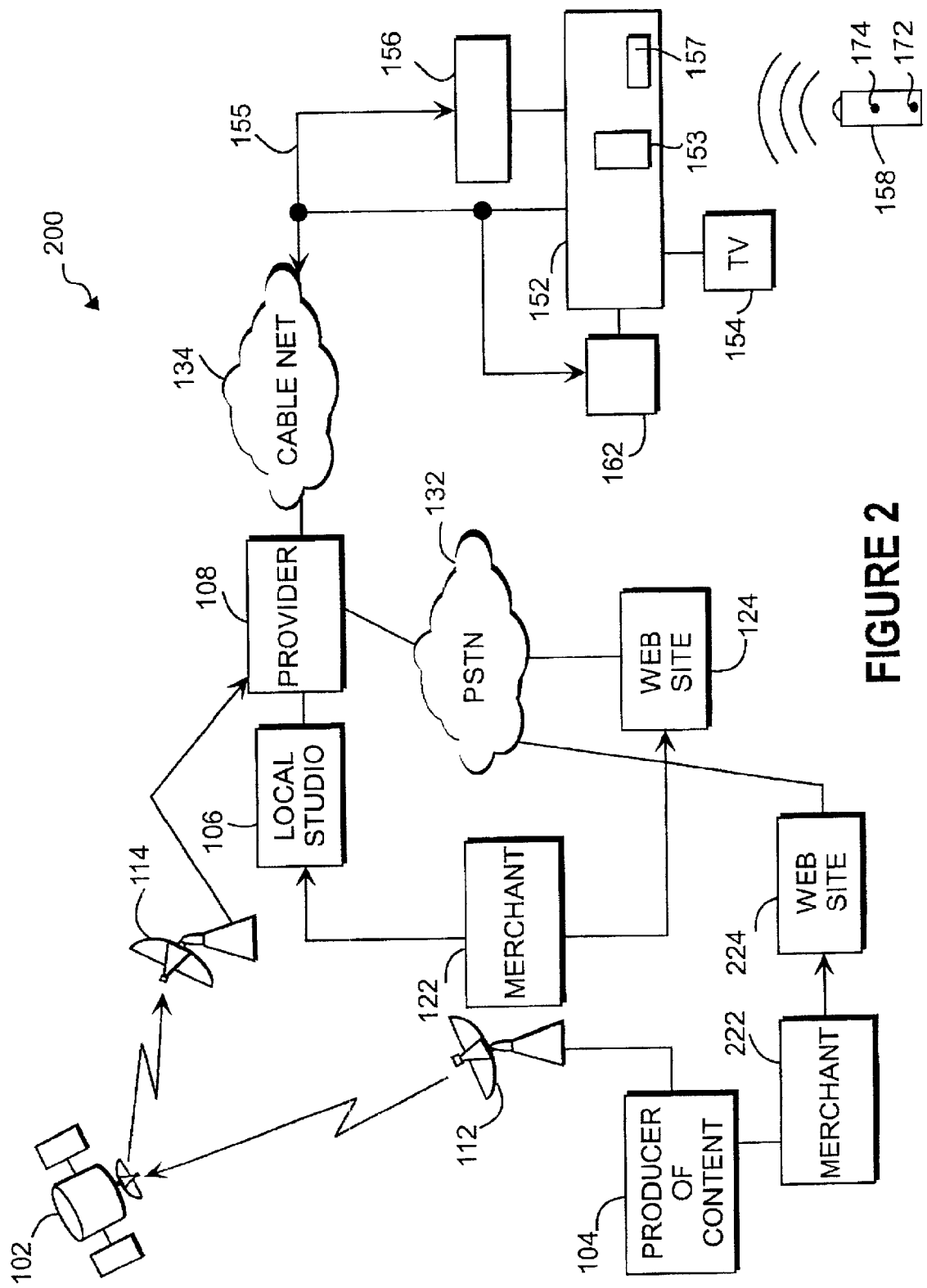
FIG. 2 shows an example of an interactive television system that can implement an embodiment of the invention.

As noted above, the triggers, resources, or announcements can be inserted by the originating broadcaster 104, a local broadcaster 106, or by the cable system operator 108. FIG. 2 shows another example of an interactive television system 200 and illustrates another point of insertion of the product supplemental information. Here, a merchant 222, operating a web site 224, is located such that commercial insertion is made prior to the uplink transmission to the satellite 102.

As noted above, Internet access is not necessary to practice the invention. A locally provided network may be within the scope of the invention as claimed. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

Figure 3:
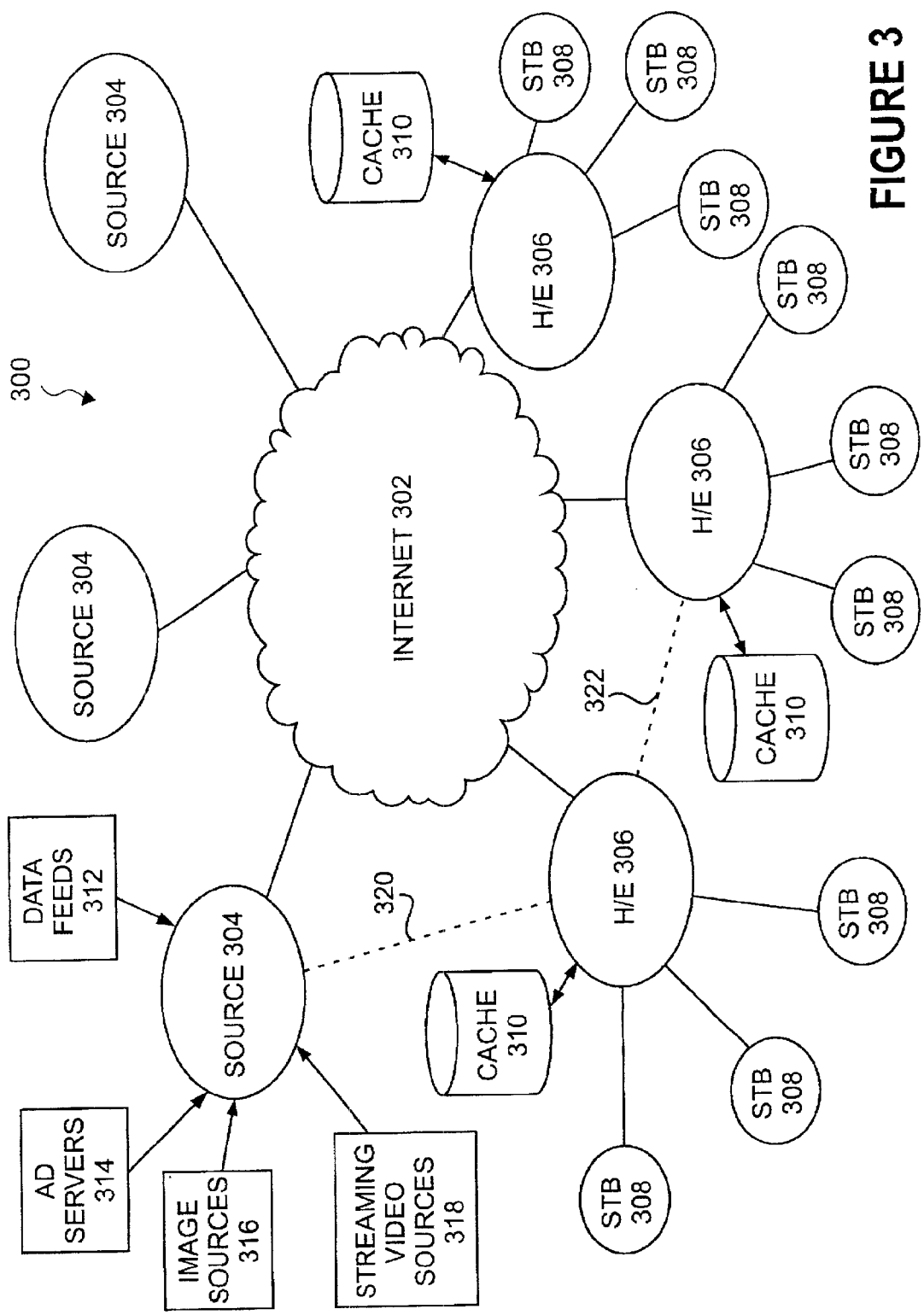
FIG. 3 shows an example of an interactive television system that can implement an embodiment of the invention.

FIG. 3 shows another example of an interactive television system 300 for distributing Internet content in addition to television content. The system 300 can be similar to or combined with the systems 100 and 200 shown in FIGS. 1 and 2, respectively. In accordance with an embodiment of the present invention, the system 300 can be integrated with a cable television distribution system. The system 300 includes an Internet 302, a plurality of content sources 304, a plurality of distribution centers (depicted as the head-ends or H/Es 306), and a plurality of client terminals 308 (depicted as set top boxes). In addition, a content source 304 is depicted as receiving data from data feeds 312, advertisement servers 314, image sources 316, and streaming video sources 318.

The plurality of content sources 304 is coupled to the Internet 302. For example, a content source 304 may comprise a web site portal such as Go2Net.com, or a news web site such as CNN.com, or other types of sources. Each content source 304 may have various data feeds 312, servers 314, and sources 316/318 coupled to it.

For example, news or stock quote feeds 312 may be fed into the content source 304. Servers 314 may provide advertisements for insertion into multimedia content delivered by the content source 304. Sources 316/318 may provide images 316, streaming video 318, and other content to the content source 304. Various other feeds, servers and sources may also be coupled to the content source 304 of FIG. 3, or coupled to the production company 104, cable network 134, web sites 124 and 224, or to other components of the systems shown in FIGS. 1 and 2.

The Internet 302 comprises a network of networks and is well known in the art. Communications over the Internet 302 can be accomplished using standard protocols such as transmission control protocol/internet protocol (TCP/IP), hypertext transfer protocol (HTTP), file transfer protocol (FTP), or other protocols. The Internet 302 is coupled to the plurality of distribution centers 306, and each distribution center 306 is in turn coupled to a plurality of client terminals 308, which may comprise a set top box, a PC, an interactive television set, or another type of communication device or display device.

In alternative or in addition to the Internet 302 being used to distribute multimedia content from the content sources 304 to distribution centers 306, communications channels or networks 320 apart from the Internet 302 may couple one or more content sources 304 to one or more distribution centers 306. One example of such an alternate path for communications is illustrated by a first dashed line 320 in FIG. 3. Alternately or additionally, peering connections may exist between distribution centers 306. One example of such peering is illustrated by a second dashed line 322 in FIG. 3. Other configurations are also possible and are included within the scope of the present invention.

Caches 310 may be provided at (or coupled to) the distribution centers 306. Such caches 310 may be used to increase the performance in the delivery of multimedia content to the client terminals 308. For example, larger files for video and other high bandwidth content may be stored in such caches 310, which may be closer to the client terminals 308 than to the content sources 304. In addition, reliability and guaranteed bandwidth may be provided because the Internet 302 is not in-between such caches 310 and the client terminals 308.

Figure 4:
FIGS. 4–9 illustrate an example of a transaction that can be conducted using the interactive television systems of FIGS. 1–3 according to an embodiment of the invention.

FIGS. 4–9 illustrate a transaction that can be conducted using the interactive television systems of FIGS. 1–3 according to an embodiment of the invention. In FIG. 4, a broadcast segment (such as a television commercial 402) is displayed on the television set 154 for viewing by a viewer. In the example shown in FIG. 4, the television commercial 402 is an advertisement for shoes, and it is to be appreciated that other types of broadcast segments or subject matter may be displayed, such as public service announcements, previews of upcoming programming, "infomercials," or other programming that can be displayed as part of an interactive television transmission. Furthermore, the broadcast segments or the interactive television transmission need not be live in one embodiment, and may be pre-recorded, played from a VCR, buffered prior to display, etc. or any suitable combination of these methods.

The television commercial 402 may have an audio or visual (or both) indicator 404 to indicate the availability of enhanced content (e.g., product supplemental information), which the viewer can access using a user input device. In the example shown in FIG. 4, the indicator 404 is a "Buy" button that invites the viewer to buy shoes. The indicator 404 may be an "Info" button that provides information, there may be multiple indicators 404, or one or more indicators may be used for a combination of purposes (e.g., buying, requesting information, turning enhanced content on/off, activating a menu, etc.), according to various embodiments.

Figure 5:
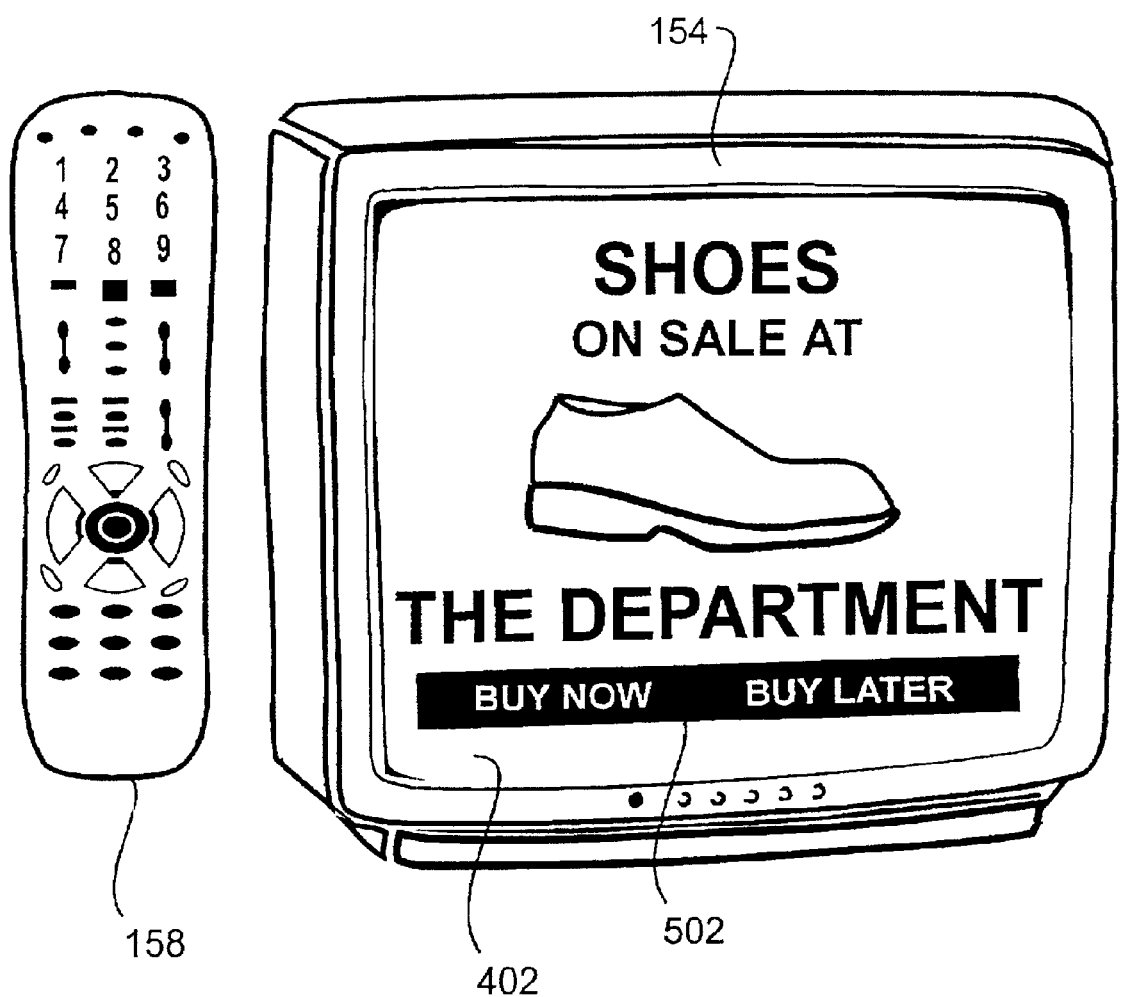

Activation of the indicator 404, by pressing a buy button 174 or an information button 172 of the remote control unit 158 shown in FIGS. 1–2 and in FIG. 5, according to one embodiment, initiates a transaction associated with the television commercial 402 by sending a command to the set top box 152 to initiate the transaction. In another embodiment, user input devices other than or in addition to the remote control unit 158 may be used. The set top box 152 subsequently transmits the command to a server and/or web site of the merchant responsible for fulfilling customer orders.

In FIG. 5, the television commercial 402 can display a prompt 502 that asks the viewer whether the viewer wishes to "Buy now" or "Buy later." In one embodiment, the television commercial 402 stops when the prompt 502 is displayed. In another embodiment, the television commercial continues playing while the prompt 502 is displayed. If the viewer uses the remote control unit 158 to "click" the "Buy now" selection in response to the prompt 502, then additional command(s) can be sent from the set top box 152 to the participating merchant to allow the viewer to conduct and complete the transaction. Thereafter, the viewer can use the remote control unit 158 to enter information, make ordering selections, access hyperlinks, etc.

If the viewer uses the remote control unit 158 to "click" the "Buy later" selection in response to the prompt 502, then the transaction is deferred. The viewer may defer the transaction, for example, if the television commercial 402 has finished playing, and therefore, the viewer does not wish the transaction to interfere with or distract from the regular television program. In one embodiment, deferral of the transaction includes saving information (such as information previously entered by the viewer, product supplemental information, URLs and/or content of web sites accessed, transaction status information, hypertext markup language (HTML) code or other code, metatags and related descriptions of the advertised product, "snapshots" of the television commercial, or other information useable for future completion of the transaction). This information may be saved in the set top box 152, in a server in the systems 100,200,300 of FIGS. 1–3, or in one or more other suitable storage locations. Such saved information is also useable to provide the viewer with a context in which the original transaction was made, whenever the viewer resumes the transaction. In one embodiment, at least some of this information may be saved in a "shopping cart" for later retrieval and processing.

Figure 6:
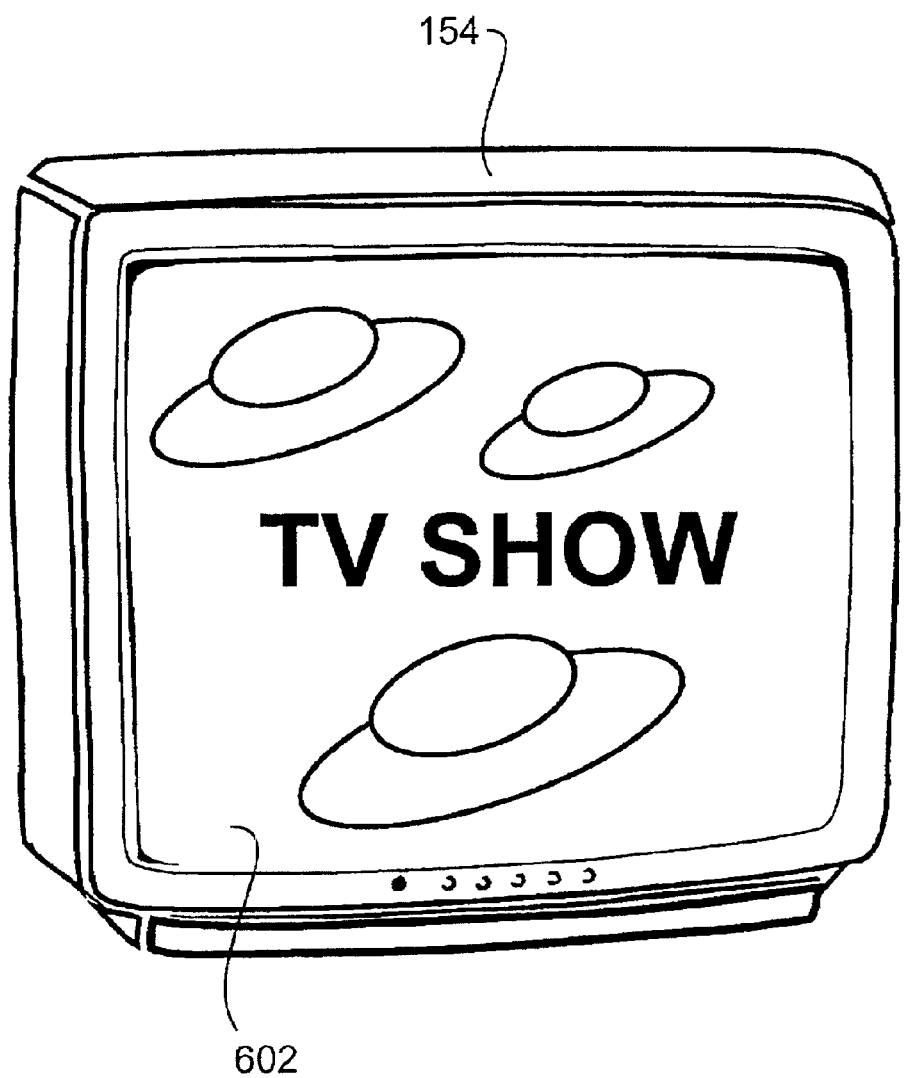

FIG. 6 illustrates a subsequent situation where regular programming 602 resumes (e.g., the television commercial 402 has ended) or when other images are displayed on the television set 154 after playing at least a portion of the television commercial 402. While the regular programming 602 is playing, the information described above related to the prior-initiated transaction (if any) is stored in a storage system or shopping cart-type system.

Figure 7:

FIG. 7 illustrates a situation when the viewer is ready to review the shopping cart, shown as a "family safe" 702, or other user interface. Such a situation may occur after the regular television programming 602 has ended, during another commercial break, or during other times. In one embodiment, the family safe 702 may be displayed in response to a click on the remote control unit 158 by the viewer. The family safe 702 may be displayed with or without previously prompting the viewer.

The family safe 702 can display a listing 706 of items, such as a listing of pending transactions, previously completed transactions, canceled transactions, etc. The family safe 702 may provide more than simple shopping cart functionality. It may also store information such as the shipping address of the family, restrictions on purchases by individual family members (for example, children), credit card information if applicable, bonus point ("mileage") plan information if applicable, and so on. Account information, advertising, instructions, product information, or other information may also be displayed in the family safe 702. In the example shown in FIG. 7, the previously initiated and deferred transaction for the shoes is identified at 704. If the viewer is interested in resuming the transaction for the shoes, then the viewer can use the remote control unit 158 to send a command to the set top box 152 to resume the transaction (e.g., the viewer can click on the particular item listed in the family safe 702). Such an action/command can result in submission/authorization for the order, the display of additional information, or other transaction-related activities.

Figure 8:

As an example, FIG. 8 shows graphics, text, and other information 802 related to the shoes that can be displayed in response to the viewer's "clicking" of the item 704 in the family safe 702. The displayed information 802 can include a picture of the shoes, as well as product supplemental information describing the shoes and other displayed information useable for the transaction. The displayed information 802 can further include a "commercial" button 804 and a "buy" button 806. If the viewer clicks the buy button 806, then subsequent completion of the transaction can occur.

Figure 9:
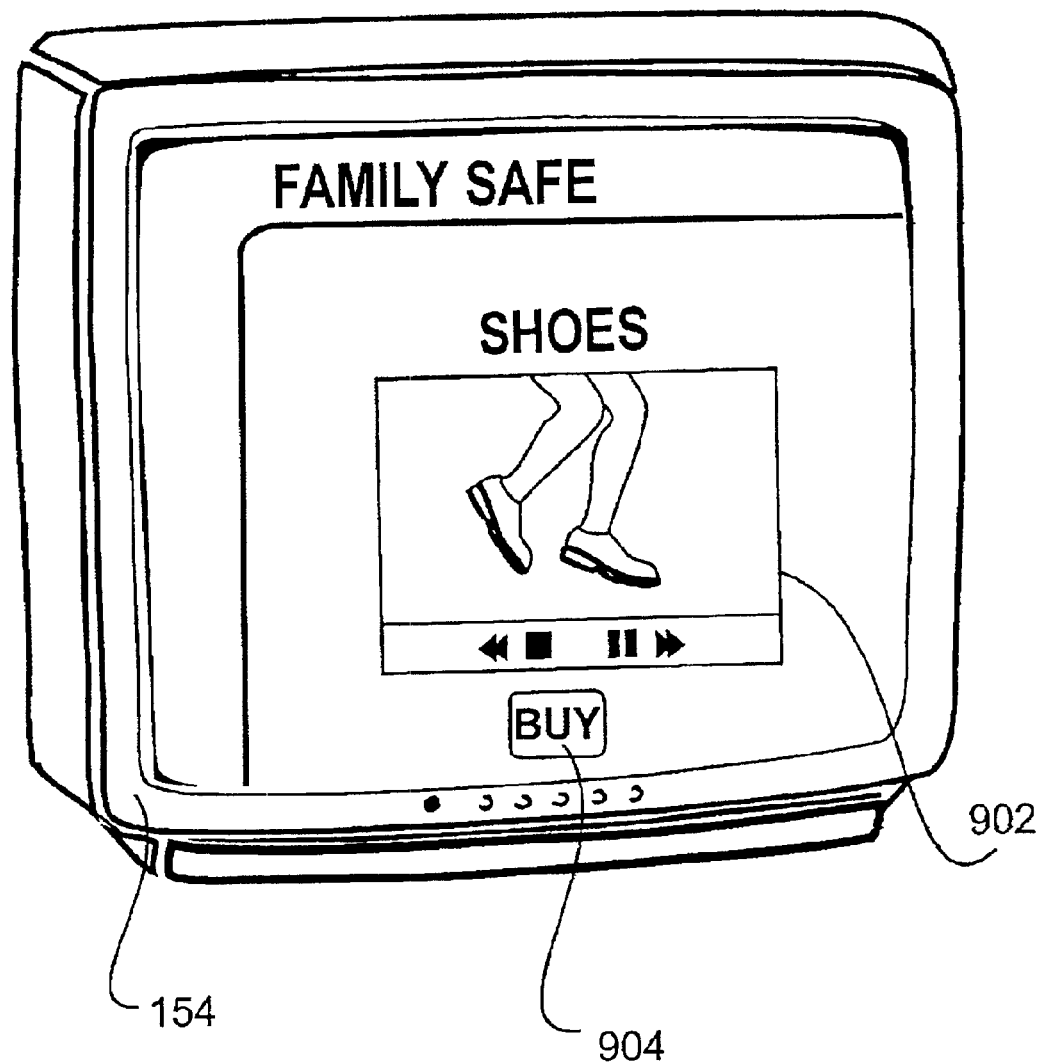

If the viewer clicks the commercial button 804, then the commercial can be replayed in a user interface, as shown at 902 in FIG. 9. The replaying may be done by streaming data from a web site or server located in the systems shown in FIGS. 1–3 in one embodiment. By replaying the commercial at 902, as an example, the context in which the television commercial and in which the related transaction were first presented to the viewer can be displayed again. Repeating the display reminds the viewer of the advertised product and potentially rekindles the viewer's interest. For example, the display at 902 can remind the viewer where he/she was when the viewer saved the purchase opportunity into the shopping cart. If the viewer decides to purchase the advertised product, then the viewer can click on a buy button 904 to finalize the transaction.

In one embodiment, the information shown in FIGS. 7–9 can be displayed by accessing and obtaining buffered/stored content from storage location(s) in the set top box 152, from servers or databases in the interactive television systems 100,200,300 of FIGS. 1–3, from storage location(s) in other suitable locations, or any suitable combination of these locations. Reconnection and/or requests from the set top box 152 (triggered by user-activation from the remote control unit 158) to the Internet can be made, in one embodiment, if the content needed for the transaction has not been previously buffered or cached. This allows the viewer to receive additional display content (e.g., the display of the family safe 702, product information 802, commercial 902, etc.), URLs, or other information useable for completion of the transaction. Reconnection to the Internet (or use of an existing connection to the Internet) also allows the remote control unit 158, set top box 152, television set 154, etc. to send information or commands to a server or web site associated with the sponsor/originator of the television commercial 402, thereby allowing transmission of the viewer's selection(s) or input related to the transaction.

Examples of data that can be displayed as shown in FIGS. 7–9 or other data provided to the viewer when resuming the transaction can include streaming data or media, web pages, hyperlinks, product supplemental information, graphics and text, "snap shots," or any subset of these. It is further possible to provide other data, such as information syndicated from a content channel that may be related in some manner to the advertised product or to a particular television program/channel. Examples include advertisements for co-branded goods and services.

Although FIGS. 4–9 illustrate an example when several actions are conducted to eventually complete a transaction to purchase shoes, for example, it is understood that an embodiment of the invention may be used to defer any single action which may be a part of an overall transaction. That is, a portion of a transaction may involve connection to a web site, while another portion of the transaction may involve obtaining information prior to submitting an order. These individual actions may be deferred and completed individually, or completed in groups. Furthermore, it is possible to "stagger" the deferrals across a period of time, rather than deferring and/or completing all individual actions in just a single instance. That is, the individual items in the family safe 702 need not all be ordered at once, and instead, may be ordered/canceled individually or in groups.

It is also understood that transactions may be "completed" after being deferred, without necessarily resulting in an ultimate purchase of the advertised product. That is, if after resuming the transaction after deferral and after accessing the family safe 702, the viewer decides not to purchase the product, the viewer can press a "Cancel" button or simply stop conducting the transaction. In such a case, the transaction is "completed" even though the advertised product was not ultimately purchased. Also, it is also understood that "completion of a transaction" does not necessarily include subsequent events such as delivery of the ordered product to the viewer via U.S. mail, mailing of receipts electronically or in hard copy form, etc. Accordingly, FIGS. 4–9 illustrate only one example of how to defer transactions, and other ways to defer transactions or portions of transactions are possible.

Figure 10:
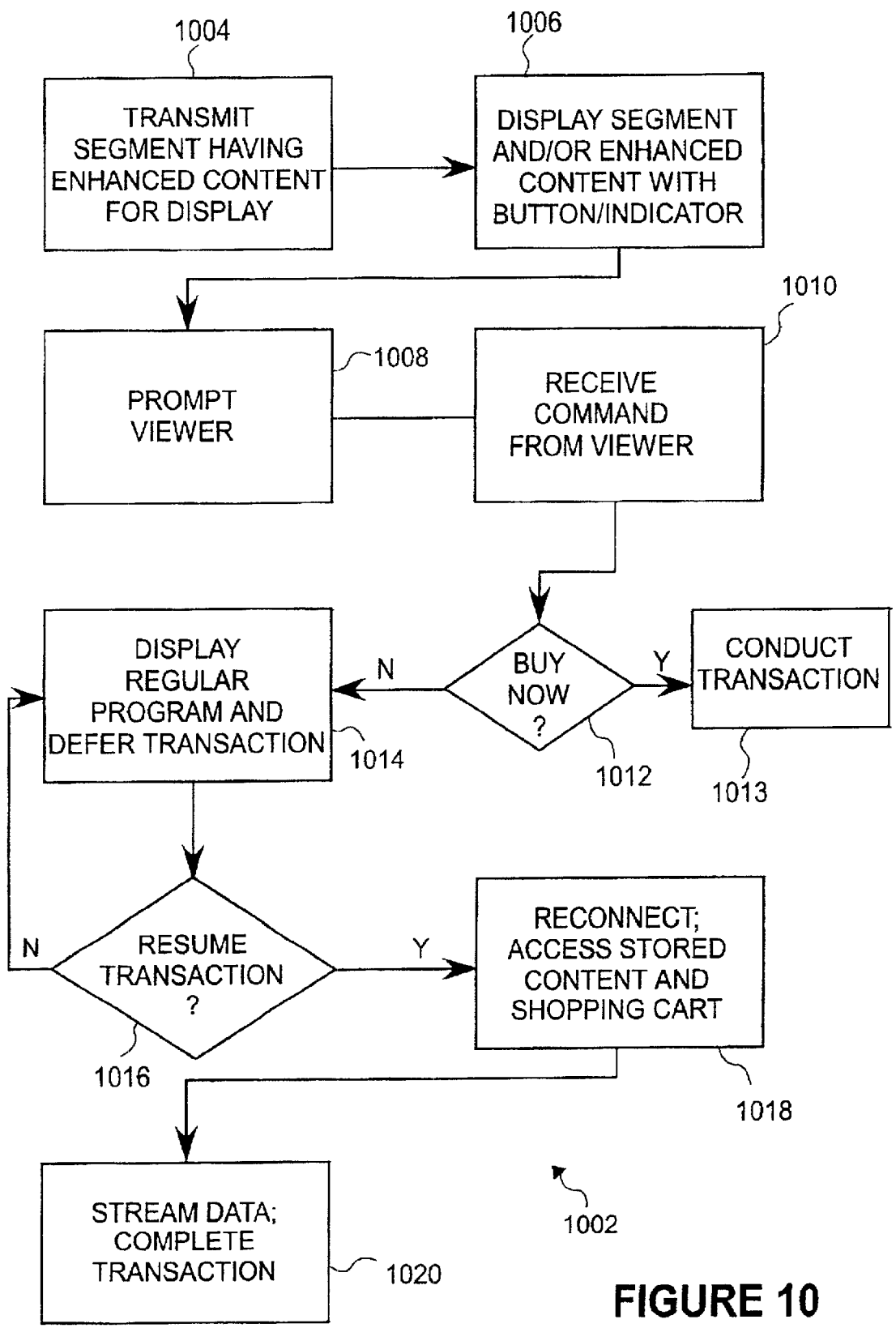
FIG. 10 is a flow diagram illustrating an example of a sequence of events during a transaction conducted via the interactive television systems of FIGS. 1–3 according to an embodiment of the invention.

FIG. 10 is a flow diagram 1002 illustrating an example of a sequence of events to initiate and complete a transaction according to an embodiment of the invention. The elements of the flow diagram 1002 can be implemented, in whole or in part, by machine-readable instructions, software, code, etc. that is stored in one or more machine-readable storage media. The machine-readable storage media can be located in the set top box 152, in another device coupled to the television set 154, in one or more servers in the systems shown in FIGS. 1–3, or in any suitable combination of these locations.

Beginning at 1004, television programming is sent to the set top box 152. The television programming can include one or more broadcast segments, such as the television commercial 402 that includes enhanced content or product supplemental information that can be displayed on the television set 154. At 1006, the broadcast segment, and/or its associated enhanced content that is useable for a potential transaction, can be displayed along with the indicator 404. It is further possible, in one embodiment, for at least some of the information to be buffered/stored/cached while displaying the broadcast segment. Examples of the information that can be stored include portions of the television commercial, web pages, URLs, templates having product order forms or ordering instructions, control and communication data useable for conducting the transaction, data associated with triggers and announcements, etc. In one embodiment, this storage can occur in conjunction with the reception of the segment and independently of viewer action via the remote control unit 158. In another embodiment, this storage can be in response to and triggered by viewer action that sends a command to the set top box 152, such as when the viewer hits the buy button 174 or the information button 172 of the remote control unit 158.

At 1008, one or more prompts 502 can be displayed on the television set 154 that asks the viewer whether the viewer wishes to conduct the transaction now or later. In response, the viewer can use the remote control unit 158 to send a command to initiate, defer, or proceed with the transaction, as shown at 1010. For example at 1012, if the viewer clicks the "Buy now" selection in the prompt 502, then a command is sent from the set top box 152 and received at a server or web site of the advertising merchant that requests continuance of the transaction, thereby allowing the transaction to be conducted and completed at 1013. The transaction is conducted at 1013, which can include activities such as providing the viewer with access to URLs, receiving transaction information or commands from the viewer, sending information related to the transaction to the viewer, etc.

If at 1012, the viewer clicks the "Buy later" selection in the prompt 502, then a command is sent from the set top box 152 and received at a server or web site of the advertising merchant that requests deferral of the transaction. The regular television programming is displayed and the transaction is deferred at 1014. As described above with reference to FIGS. 4–9, deferral of the transaction at 1014 can include the placement of the viewer's order in a shopping cart and the saving of content and context related to the transaction or television commercial.

The information associated with the incomplete transaction is stored at 1014, and activity is monitored at 1016 for an indication of whether the transaction can be taken off its deferred state. This activity that is indicative of a possible continuance of the transaction can include, for example, the beginning of the next commercial break, receiving a signal/command from the viewer to resume the transaction (sent via the remote control unit 158), displaying a prompt on the television set 154 that requests the viewer to complete the transaction and then receiving a command from the viewer in response to the prompt, providing the family safe 702 for display and receiving input from the viewer related to an item in the family safe, etc. If such activities are not detected, then deferral of the transaction and display of the regular programming continues at 1014.

If activity is detected at 1016 indicating that the transaction can resume, then the transaction is conducted at 1018 and represented by way of example in FIGS. 8 and 9. Reconnection to the Internet and/or to the relevant web pages related to the transaction can occur at 1018, as well as access and retrieval of stored content for the transaction. If necessary, filtering or suppression of triggers, announcements, resources, and other data related to the currently displayed television program or television commercial can also be implemented at 1018, so as not to interfere with the resumed transaction. Such filtering or suppression, including the stripping of triggers, can be performed by a multiple system operator (MSO), components of the set top box 152, or by other components in the systems shown in FIGS. 1–3 or at the client/viewer side. At 1020, the streaming of data related to the television commercial can occur or the data related to the commercial may simply be retrieved from local storage, and the transaction may be completed.

In conclusion, an embodiment of the invention allows the viewer to save content (and context) related to a transaction conducted via interactive television systems such as those shown in FIGS. 1–3. The transaction can involve obtaining information or ordering goods/services available from the Internet via the interactive television system. As an example, while the viewer is watching the television commercial 402, the viewer can defer a transaction related to a product advertised in the television commercial 402 or defer the viewing of the television commercial itself. Information related to the television commercial 402 may be saved in a shopping cart for subsequent processing. The subsequent processing can include retrieval of the shopping cart information, replaying of the television commercial 402, and then completion of the previously deferred transaction. The saving of the content related to the television commercial 402, the information related to the transaction, and the context in which the transaction originated or was previously conducted provide for the opportunity to increase the likelihood of consummating/completing the transaction. Furthermore, use of a shopping cart and other methods described herein, substantially removes the need for a viewer to remember or write down all information related to an advertised product while the television commercial 402 is playing.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while the remote control unit 158 has been described herein as a device that can be used by the viewer to make transactions, it is to be appreciated that other user input devices can provide features that are similar to those provided by the remote control unit 158. For instance, a laptop computer or a PC coupled to the set top box 152 may be used in one embodiment as the user input device for deferring transactions. The remote control unit 158, the laptop computer, or the PC may be coupled to the set top box 152 in a wireless or hardwire manner. Furthermore, although the embodiments described herein show the remote control unit 158 interfacing with the Internet through the set top box 152, it is possible to provide an embodiment where a user input device can interface directly with the Internet without having to transmit its signals via the set top box 152.

As another example, transactions other than those related to commercials may be deferred or saved in one embodiment of the invention. That is, a regular television program can make available enhanced content that is related to the television program (e.g., while watching a football game, the viewer is presented with an indicator to indicate that statistics about a particular player are available via the Internet). The viewer can access the enhanced content while the television program is being displayed, begin a transaction related to the enhanced content, and then save/defer the rest of the transaction (or related information) at a later time, such as during the next commercial break.

As yet another example, although an embodiment has been described herein as saving content and context from a transaction related to a television commercial, content and context from other types of presentations of information may also be saved. These other presentations of information can include those involving or presented from synthetic broadcast channels (e.g., programming that is customized by a viewer), shopping channels, direct email promotions, calendaring or other communication service promotions, and services related to the upselling/cross-selling of products.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
providing a broadcast segment as part of an interactive television transmission via a first screen;
responsive to a first command received from a user input device, storing information associated with a transaction related to the broadcast segment that is capable of being conducted via a second screen, wherein the transaction is comprised of a plurality of portions, each portion having at least one action associated therewith, and wherein storing information associated with the transaction includes storing information associated with the portions of the transaction;
responsive to a second command received from the user input device and subsequent to providing at least a portion of the broadcast segment, retrieving the stored information associated with the transaction and providing content related to the broadcast segment; and
repeatedly storing and retrieving information associated with the transaction in response to receipt of the first and second commands, respectively, permitting the actions associated with the portions of the transaction to be completed at different intervals between which at least a portion of the broadcast segment is provided until the transaction is completed.

2. The method of claim 1 wherein the first and second screens comprise screens that are capable of being presented by a television set.

3. The method of claim 1 wherein the first and second screens comprise screens that are capable of being presented by a computer.

4. The method of claim 1 wherein providing the content related to the broadcast segment in response to the second command includes presenting at least some of the content via the second screen.

5. The method of claim 1 wherein at least some of the information associated with the transaction is capable of being entered via the user input device in cooperation with the second screen.

6. An article of manufacture, comprising:
a machine-readable medium having instructions stored thereon to:
receive a broadcast segment as part of an interactive television transmission and present the broadcast segment via a first screen;
responsive to a first command received from a user input device, store information associated with a transaction related to the broadcast segment that is capable of being conducted via a second screen, wherein the transaction is comprised of a plurality of portions, each portion having at least one action associated therewith, and wherein storing information associated with the transaction includes storing information associated with the portions of the transaction;
responsive to a second command received from the user input device and subsequent to providing at least a portion of the broadcast segment, retrieve the stored information associated with the transaction and provide content related to the broadcast segment; and
repeatedly store and retrieve information associated with the transaction in response to receipt of the first and second commands, respectively, permitting the actions associated with the portions of the transaction to be completed at different intervals between which at least a portion of the broadcast segment is provided until the transaction is completed.

7. The article of manufacture of claim 6 wherein the first and second screens comprise screens that are capable of being presented by a television set.

8. The article of manufacture of claim 6 wherein the first and second screens comprise screens that are capable of being presented by a computer.

9. The article of manufacture of claim 6 wherein the instructions to provide the content related to the broadcast segment in response to the second command includes presenting at least some of the content via the second screen.

10. The article of manufacture of claim 6 wherein at least some of the information associated with the transaction is capable of being entered via the user input device in cooperation with the second screen.

11. A client apparatus for an interactive television, the client apparatus comprising:
a communication interface to receive supplemental information as part of a broadcast segment in an interactive television transmission and to present the broadcast segment and supplemental information via a first screen;
a processor responsive to a first command received via the communication interface from a user input device to trigger storage of data associated with a transaction related to the broadcast segment that is capable of being conducted via a second screen, wherein the transaction is comprised of a plurality of portions, each portion having at least one action associated therewith, and wherein storing information associated with the transaction includes storing information associated with the portions of the transaction; and
a storage unit to store the data associated with the transaction related to the broadcast segment and to store at least a portion of the supplemental information in response to the first command, the processor being responsive to a second command, received via the communication interface from the user input device and subsequent to display of at least a portion of the broadcast segment, to retrieve the stored data and at least some of the stored supplemental information from the storage unit and to provide the retrieved data and supplemental information for viewing by an end user, the processor being configured to thereafter repeatedly store and retrieve information associated with the transaction in response to receipt of the first and second commands, respectively, permitting the actions associated with the portions of the transaction to be completed at different intervals between which at least a portion of the broadcast segment is provided until the transaction is completed.

12. The client apparatus of claim 11 wherein the first and second screens are capable of being presented by a television set.

13. The client apparatus of claim 11 wherein the processor is responsive to another command received from the user input device to display the second screen.

14. The client apparatus of claim 11 wherein the processor is capable to provide at least some of the retrieved data and supplemental information via the second screen.

15. The client apparatus of claim 11 wherein at least some of the data associated with the transaction is capable of being entered via the user input device in cooperation with the second screen.

16. A system, comprising:
a television network connectable to a communication network to provide a broadcast segment, having supplemental information, as part of an interactive television transmission via a first screen; and
a client terminal coupleable to the television network, the client terminal including:
a communication interface to receive the supplemental information as part of the broadcast segment;
a processor responsive to a first command received via the communication interface from a user input device to trigger storage of data associated with a transaction related to the broadcast segment that is capable of being conducted via a second screen, wherein the transaction is comprised of a plurality of portions, each portion having at least one action associated therewith, and wherein storing information associated with the transaction includes storing information associated with the portions of the transaction; and
a storage unit to store the data associated with the transaction related to the broadcast segment and to store at least a portion of the supplemental information in response to the first command, the processor being responsive to a second command, received via the communication interface from the user input device and subsequent to display of at least a portion of the broadcast segment, to retrieve the stored data and at least some of the stored supplemental information from the storage unit and to provide the retrieved data and supplemental information for viewing by an end user,
the processor being configured to thereafter repeatedly store and retrieve information associated with the transaction in response to receipt of the first and second commands, respectively, permitting the actions associated with the portions of the transaction to be completed at different intervals between which at least a portion of the broadcast segment is provided until the transaction is completed.

17. The system of claim 16 wherein the first and second screens are capable of being presented by a television set coupled to the client terminal.

18. The system of claim 16 wherein the processor is responsive to another command received from the user input device to display the second screen.

19. The system of claim 16 wherein the processor is capable to provide at least some of the retrieved data and supplemental information via the second screen.

20. The system of claim 16 wherein at least some of the data associated with the transaction is capable of being entered via the user input device in cooperation with the second screen.

* * * * *

UNITED STATES PATENT AND TRADEMARK OFFICE
CERTIFICATE OF CORRECTION

| | | |
|---|---|---|
| PATENT NO. | : 7,103,908 B2 | Page 1 of 1 |
| APPLICATION NO. | : 09/834044 | |
| DATED | : September 5, 2006 | |
| INVENTOR(S) | : Mai-Ian Tomsen | |

It is certified that error appears in the above-identified patent and that said Letters Patent is hereby corrected as shown below:

On the Title Page

Item "(73) Assignee: Diego Inc., Kirkland, WA (US)..." change to
-- (73) Assignee: Digeo Inc., Kirkland, WA (US) --

Signed and Sealed this

Twenty-seventh Day of May, 2008

JON W. DUDAS
*Director of the United States Patent and Trademark Office*